(12) United States Patent
Ohara

(10) Patent No.: US 7,393,028 B2
(45) Date of Patent: Jul. 1, 2008

(54) DEVICE FOR STORING ARTICLE FOR PROTECTING AUTOMOBILE BODY

(76) Inventor: Toshiyuki Ohara, 22-33, Shin-ashiyashimo, Suita-shi, Osaka 565-0803 (JP)

(*) Notice: Subject to any disclaimer, the term of this patent is extended or adjusted under 35 U.S.C. 154(b) by 0 days.

(21) Appl. No.: 11/785,076

(22) Filed: Apr. 13, 2007

(65) Prior Publication Data

US 2007/0241572 A1 Oct. 18, 2007

Related U.S. Application Data

(63) Continuation-in-part of application No. 10/540,935, filed as application No. PCT/JP03/16829 on Dec. 25, 2003, now Pat. No. 7,222,895.

(30) Foreign Application Priority Data

Dec. 31, 2002 (JP) ............................. 2002-383830

(51) Int. Cl.
*B60R 19/40* (2006.01)
(52) U.S. Cl. ..................................................... 293/119
(58) Field of Classification Search ................ 293/119, 293/116, 118, 126, 128, 21; 280/770
See application file for complete search history.

(56) References Cited

U.S. PATENT DOCUMENTS

| | | | | |
|---|---|---|---|---|
| 3,718,357 A | * | 2/1973 | Hertzell | .......................... 293/9 |
| 4,221,412 A | * | 9/1980 | Miller | ......................... 293/118 |
| 4,461,503 A | * | 7/1984 | Melby | ......................... 293/118 |
| 4,666,196 A | * | 5/1987 | McCoy et al. | ............... 293/128 |
| 4,815,777 A | * | 3/1989 | Campbell | .................... 293/107 |
| 4,961,605 A | * | 10/1990 | Cawthron et al. | ........... 293/128 |
| 4,970,980 A | * | 11/1990 | Eisner | ........................ 114/219 |
| 5,004,281 A | * | 4/1991 | Yamazaki | .................... 293/118 |
| 5,520,428 A | * | 5/1996 | Bell | ............................ 293/118 |
| 6,161,494 A | * | 12/2000 | Pontevolpe et al. | ......... 114/219 |
| 6,834,899 B2 | * | 12/2004 | Lindsey | ...................... 293/118 |
| 6,893,079 B1 | * | 5/2005 | Johnson et al. | ........ 296/187.12 |
| 7,222,895 B2 | * | 5/2007 | Ohara | ......................... 293/118 |

FOREIGN PATENT DOCUMENTS

JP 11-291827 A 10/1999
JP 2000-085360 A 3/2000

* cited by examiner

*Primary Examiner*—H Gutman
(74) *Attorney, Agent, or Firm*—Westerman, Hattori, Daniels & Adrian, LLP.

(57) ABSTRACT

An article for protecting an automobile body is stored within the automobile body by electric power when the automobile body does not need to be protected. A device stores the article within the automobile body by electric power. The article for protecting the automobile body is mounted to a second article formed of the same material as the automobile body. The device operates the article into a state in which it protects the automobile body primarily when the automobile is parked. The device stores the article for protecting the automobile body when the automobile is running.

10 Claims, 16 Drawing Sheets

DEVICE FOR STORING ARTICLE FOR PROTECTING AUTOMOBILE BODY

This application is a continuation-in-part of Ser. No. 10/540,935 filed on Jun. 29, 2005 which is a §371 of International Patent Application No. PCT/JP2003/016829 filed on Dec. 25, 2003. This application claims priority under 35 U.S.C. §119 to Japanese Patent Application No. 2002-383830 filed on Dec. 31, 2002. The entire disclosures of each of these applications are incorporated herein by reference in its entirety.

FIELD OF THE INVENTION

The present invention relates to a device for storing within an automobile body by electric power an article mounted for protecting the automobile body when it is not necessary to protect the automobile body.

BACKGROUND OF THE INVENTION

Hitherto, in order to protect an automobile body, rubber or metal is directly mounted and secured to the automobile body.

However, this method has the following problems:

(A) Since an article which protects an automobile body is secured in a protruding manner to the automobile body, it is not possible to choose between using the article when it is required and not using the article when it is not required.

(B) Since there are constraints to the design for mounting an article which protects the automobile body in relation to the design of the automobile, rubber or metal cannot be mounted to a portion requiring protection.

(C) Therefore, when a person gets in or out of an automobile in a parking lot of, for example, a supermarket, a collision accident occurs with a door of another automobile.

The present invention is achieved to overcome these problems.

SUMMARY OF THE INVENTION

The present invention provides a device for storing within an automobile body by electric power an article having an article for protecting the automobile body mounted thereto and being of the same quality as the automobile body.

A description of an embodiment of the present invention will hereunder be given.

(A) The embodiment provides a structure in which, as shown in FIG. 17, in order to protect an automobile body, an article mounted to and having the same material as the automobile body is rotated and stored, and the automobile body and the article having the same material as the automobile body are integrated.

(B) The embodiment provides a structure in which the article having the same material as the automobile body is rotated and stored by electric power.

When the present invention is carried out using the above-described structures and it is necessary to protect the automobile body when, for example, the automobile is parked, a single-purpose motor is operated with a remote controller or a panel switch in the automobile in order to rotate the article having the same material as the automobile body and secure it in a state in which the automobile body is protected.

When the automobile body does not need to be protected, the article mounted for protecting the automobile body is stored within the automobile body.

As shown in FIG. 16, articles are mounted to portions of the automobile body that require protection, the sides, the left and right front portions, and the left and right rear portions of the automobile.

The articles mounted for protecting the automobile body are moved horizontally and are stored by electric power.

Hitherto, since the articles for protecting the automobile body are secured in a protruding manner to the automobile body, a driver cannot choose between using the articles when they are required and not using the articles when they are not required. However, the present invention makes it possible to install by electric power the articles mounted for protecting the automobile body when the driver needs to protect the automobile body.

When the automobile body does not need to be protected, the articles can be stored. Hitherto, since there are constraints on the design for mounting an article, which protects the automobile body, in relation to the design of the automobile, the article cannot be mounted to a portion of the automobile body requiring protection. In contrast, the present invention makes it possible to mount an article to any portion of the automobile body requiring protection.

In addition, the related constraints on the design no longer exist, in particular, the design of the front and rear bumpers no longer needs to be such that the bumpers be linearly disposed with articles installed on the sides for protecting the automobile body. Therefore, the design is considerably improved.

DETAILED DESCRIPTION OF THE INVENTION

Figure 1:
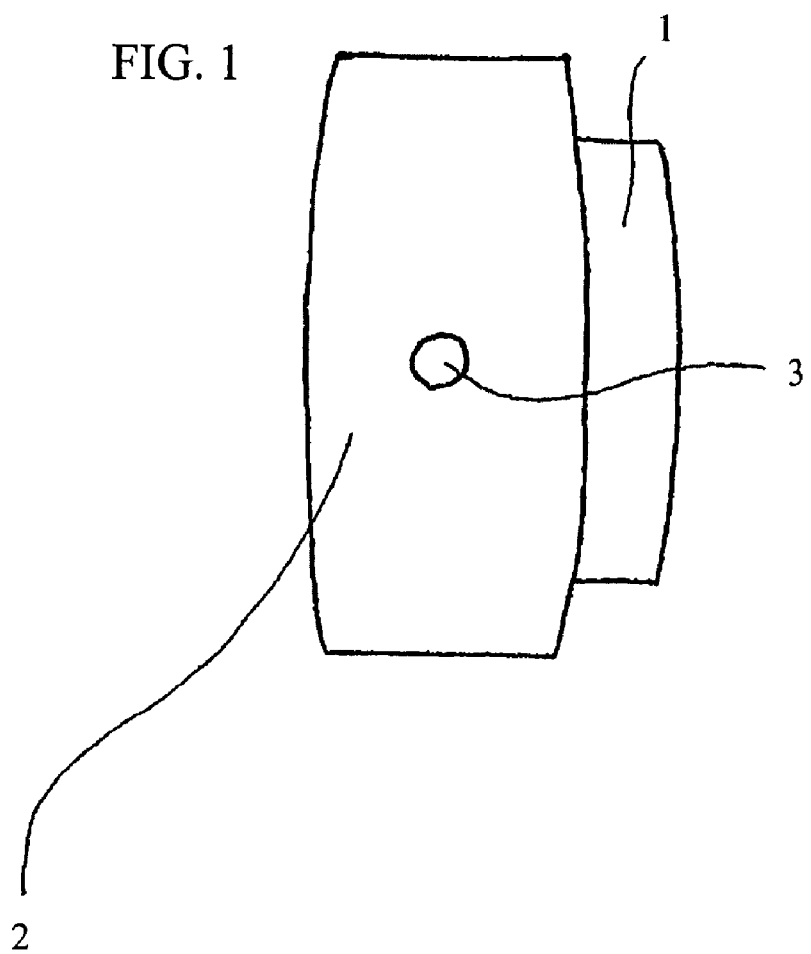
FIG. 1 is a partial enlarged side view of the present invention.

The present invention will be described in more detail with reference to the attached drawings. FIG. 1 is a partial enlarged side view of the present invention in which a rotary shaft 3 and an article 1 for protecting an automobile body are mounted to an article 2 having the same material as the automobile body. The article 2 having the same material as the automobile body is made the same as the automobile body or made similarly with a lightweight material while the article 1 for protecting the automobile body is protecting the automobile body or is stored in the automobile body. The rotary shaft 3 is connected to a device for installing by electric power the article 1 for protecting the automobile body into a state in which the article 1 protects the automobile body and into a state in which the article 1 is stored in the automobile body. The article 1 for protecting the automobile body may be formed of rubber, metal, plastic, or any other various materials for protecting the automobile body, or may be formed of a combination of these materials.

Figure 2:
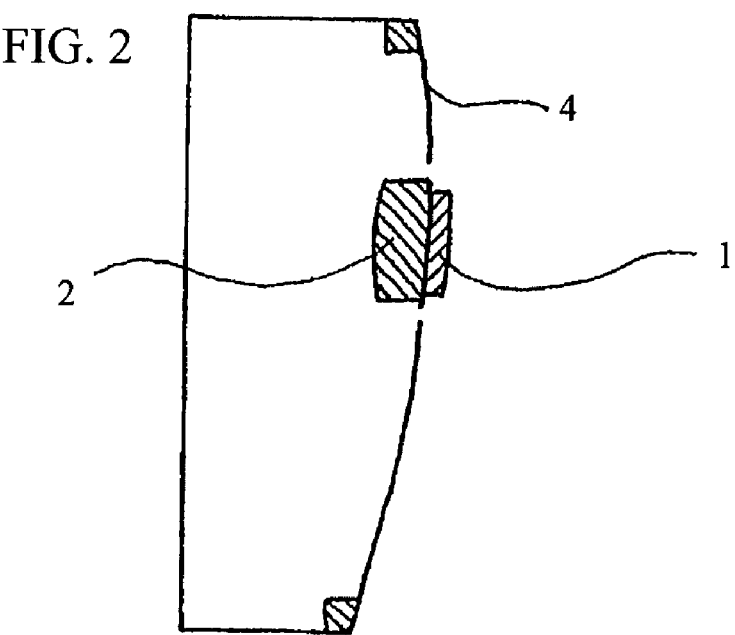
FIG. 2 is a sectional view of the present invention.
Figure 3:
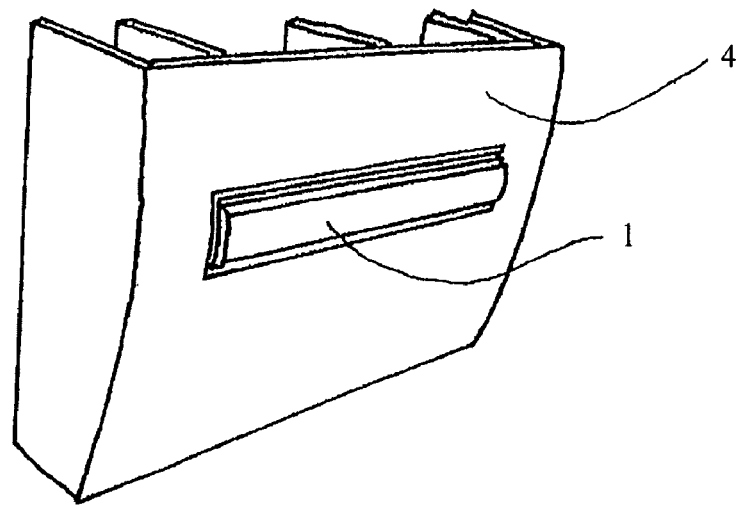
FIGS. 3, 4, 5, 6, and 7 are perspective views of the present invention.
Figure 4:
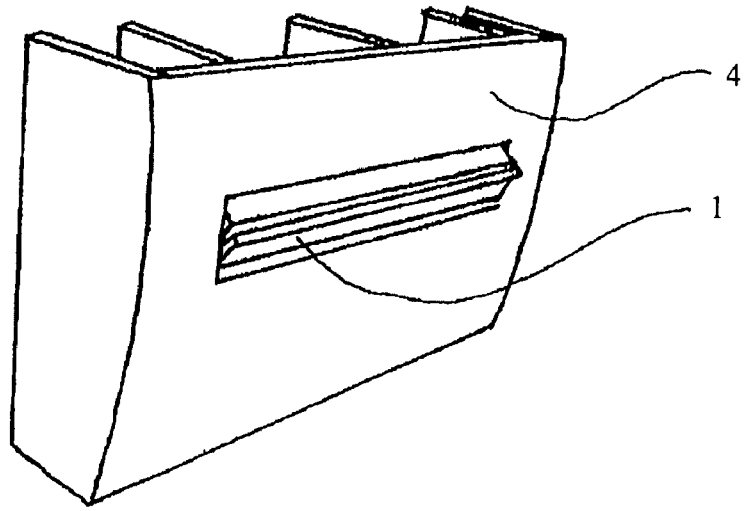
Figure 5:
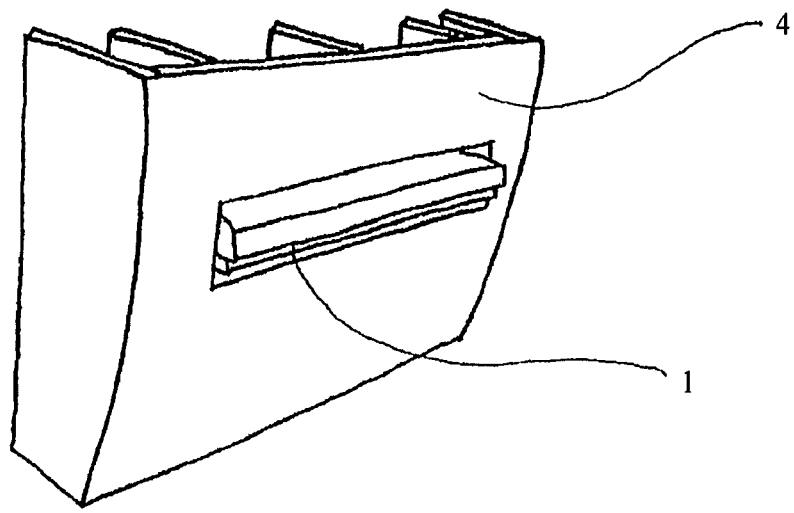
Figure 6:
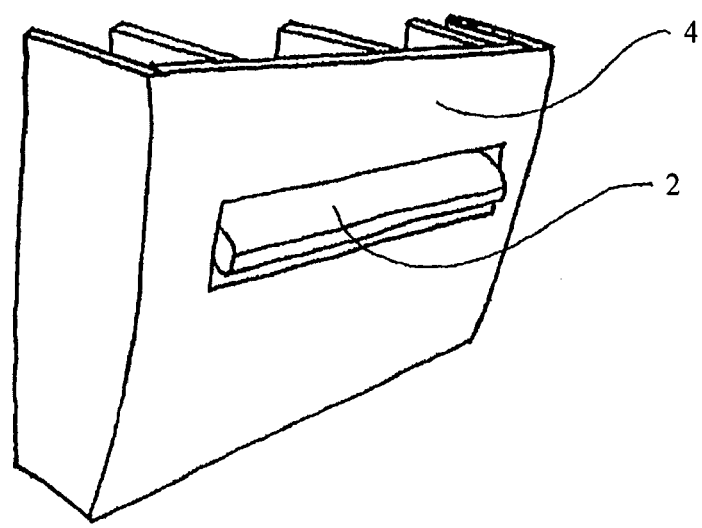
Figure 7:
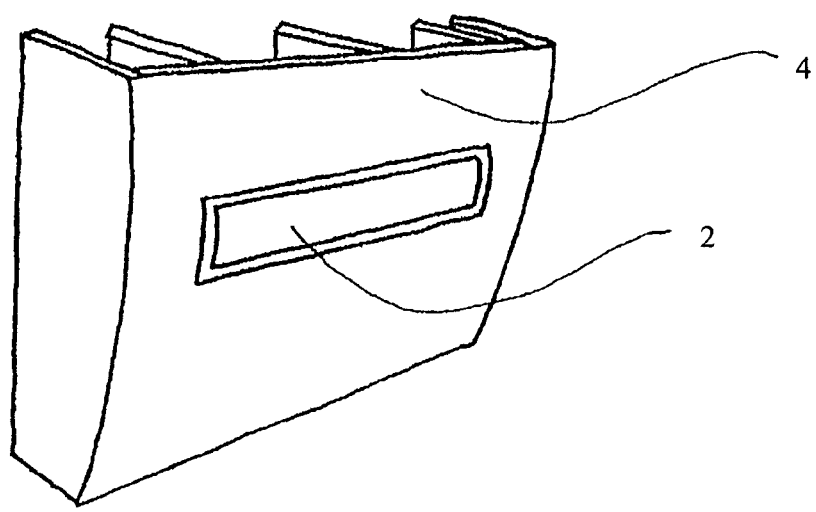
Figure 8:
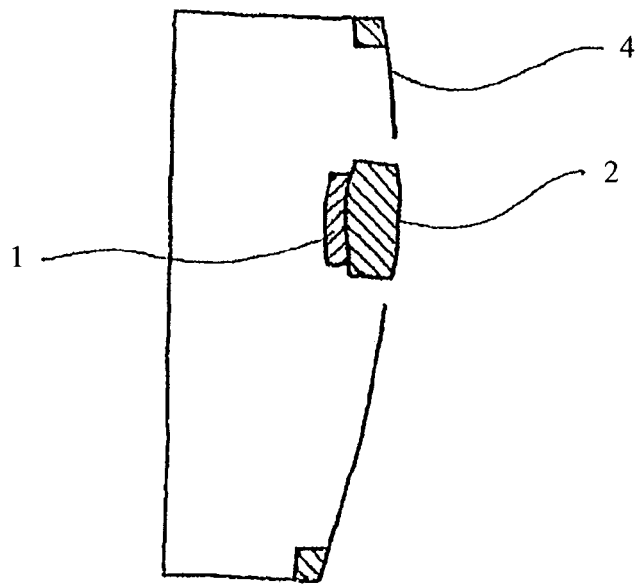
FIG. 8 is a sectional view of the present invention.
Figure 9:
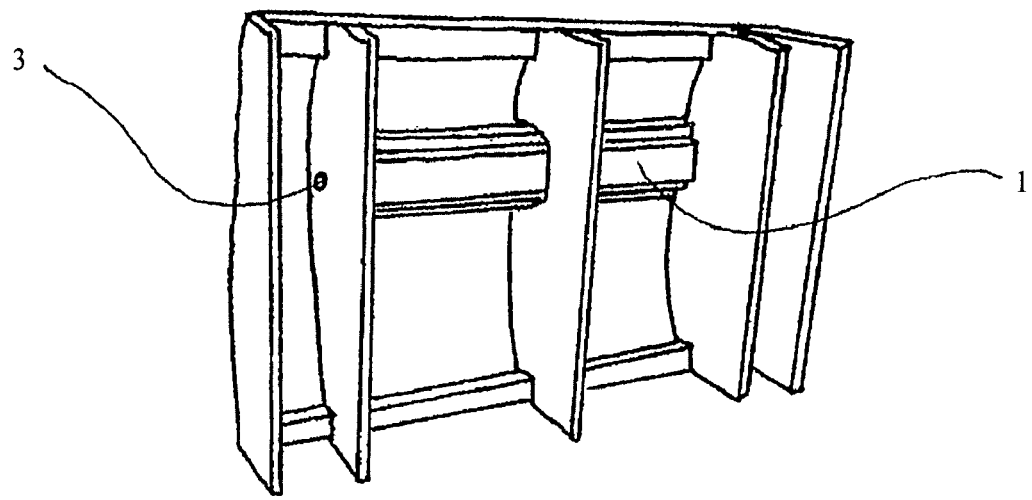
FIG. 9 is a perspective view of the present invention.

FIG. 2 is a sectional view of the present invention in which what is shown in FIG. 1 is mounted to an automobile body 4. FIG. 3 shows a state in which the article 1 for protecting the automobile body is installed into the state in which it protects the automobile body, and FIGS. 4, 5, and 6 show a state in which it is rotated and being stored. FIGS. 7, 8, and 9 show the state in which the article 1 for protecting the automobile body is stored within the automobile body.

Figure 10:
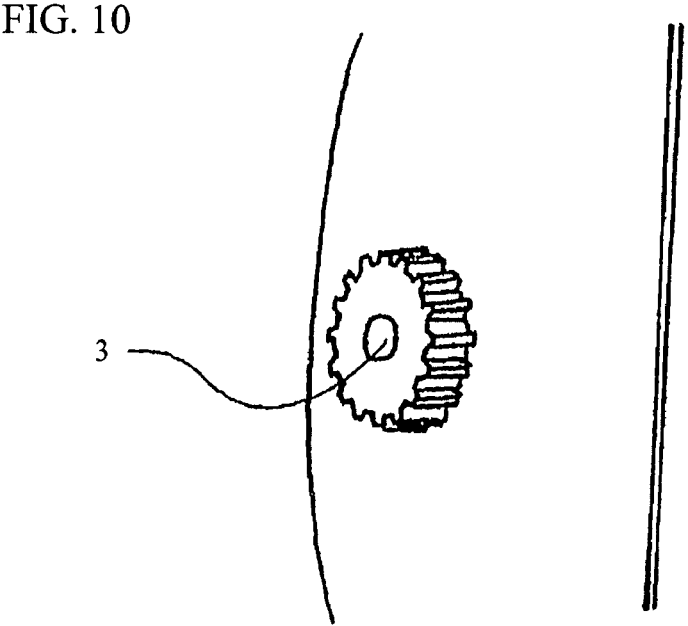
FIG. 10 is a partial enlarged perspective view of the present invention.
Figure 11:
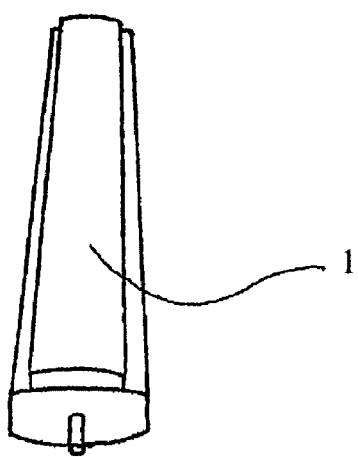
FIG. 11 is a partial perspective view of the present invention.
Figure 12:
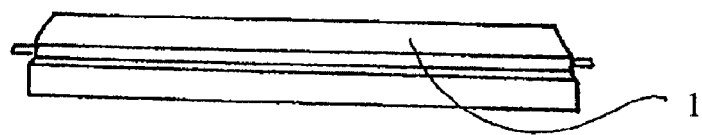
FIG. 12 is a partial perspective view of the present invention.
Figure 13:
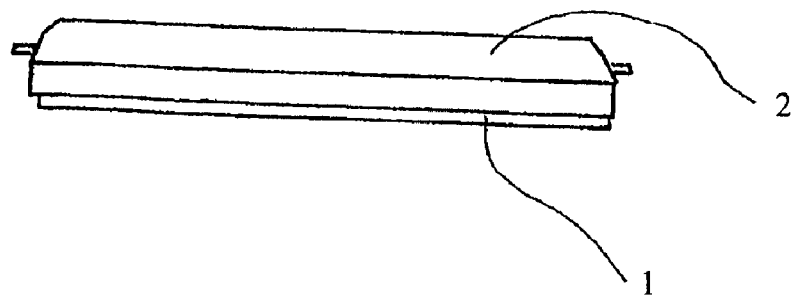
FIG. 13 is a partial perspective view of the present invention.

FIG. 10 shows the rotary shaft 3, and FIGS. 11, 12, and 13 are partial perspective views of the present invention.

Figure 14:
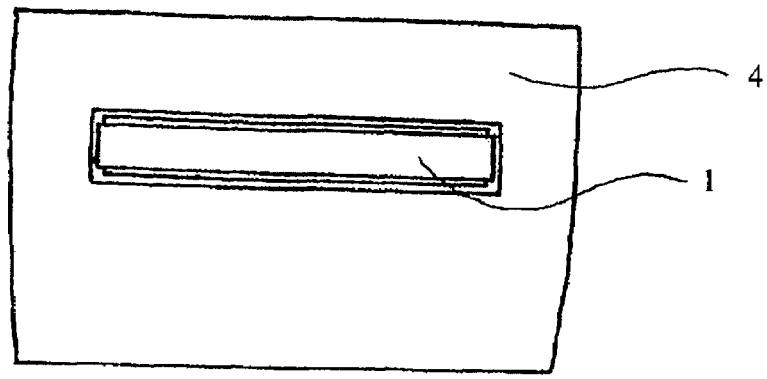
FIGS. 14 and 15 are front views of the present invention.
Figure 15:
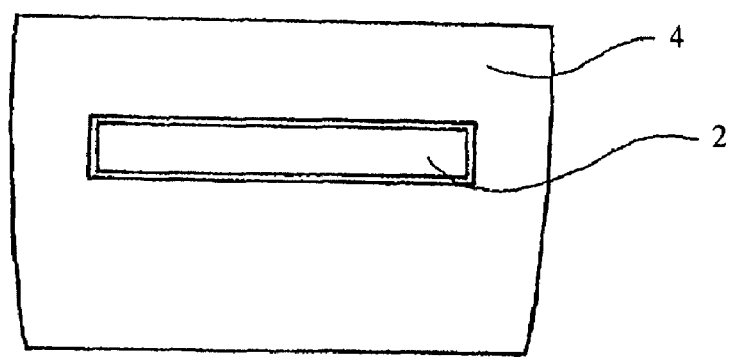

FIG. 14 is a front view showing the state in which the article 1 for protecting the automobile body protects the automobile body, and FIG. 15 is a front view showing the state in which the article for protecting the automobile body is stored in the automobile body.

Figure 16:
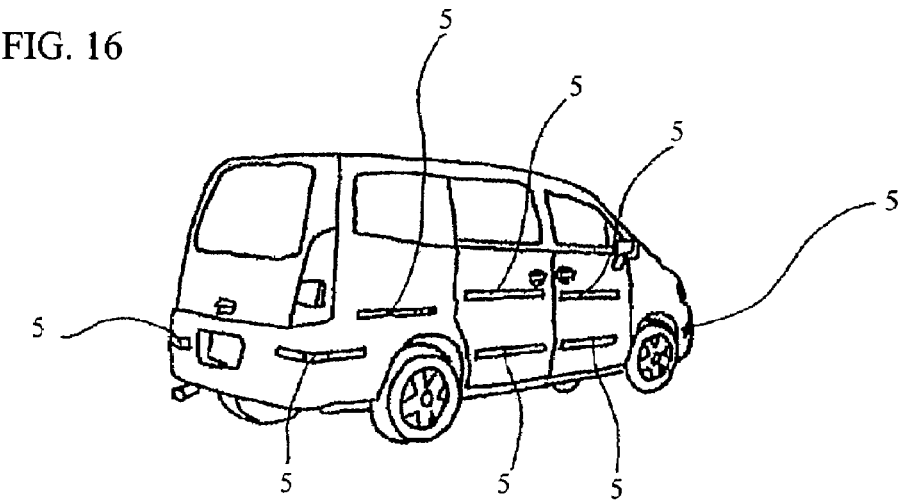
FIG. 16 illustrates an embodiment of the present invention.

FIG. 16 shows an embodiment of articles 5 of the present invention at which devices for storing articles 1 for protecting the automobile body in accordance with the present invention are mounted to the sides and corners of the automobile.

Figure 17:
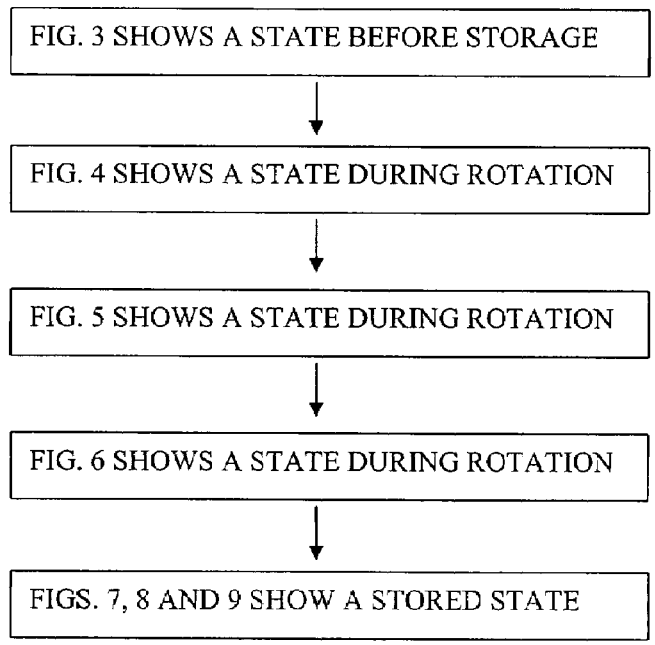
FIG. 17 is a process drawing of the present invention.

An article for protecting the automobile body is stored in the automobile body on the basis of the process drawing shown in FIG. 17. Thereafter, rotating the article 2 having the same material as the automobile body causes the article to be installed in the state in which it protects the automobile body.

In another embodiment, a device for horizontally moving and storing an article for protecting the automobile body is provided.

Accordingly, when an automobile is parked, the device for storing an article for protecting an automobile body according to the present invention makes it possible for the article for protecting the automobile body to serve as a device for protecting the automobile body by installing the article into the state in which it protects the automobile body. In addition, the storing device makes it possible for the automobile to run safely because there is no longer a protruding portion when the storing device stores the article for protecting the automobile body. Further, it is possible to use a design which could not have been hitherto used.

A production method in accordance with the present invention produces body parts of an automobile except a part to which an article for protecting an automobile body is mounted. Thereafter, the device for storing an article for protecting the automobile body is mounted, so that the assembly of the automobile body is completed.

The present invention is carried out by rotating the device for storing an article for protecting the automobile body by electric power with a switch located inside the vehicle or with a remote controller when an automobile is parked. In addition, it is carried out by storing the article for protecting the automobile body when the automobile is running or in any other state.

Figure 18:
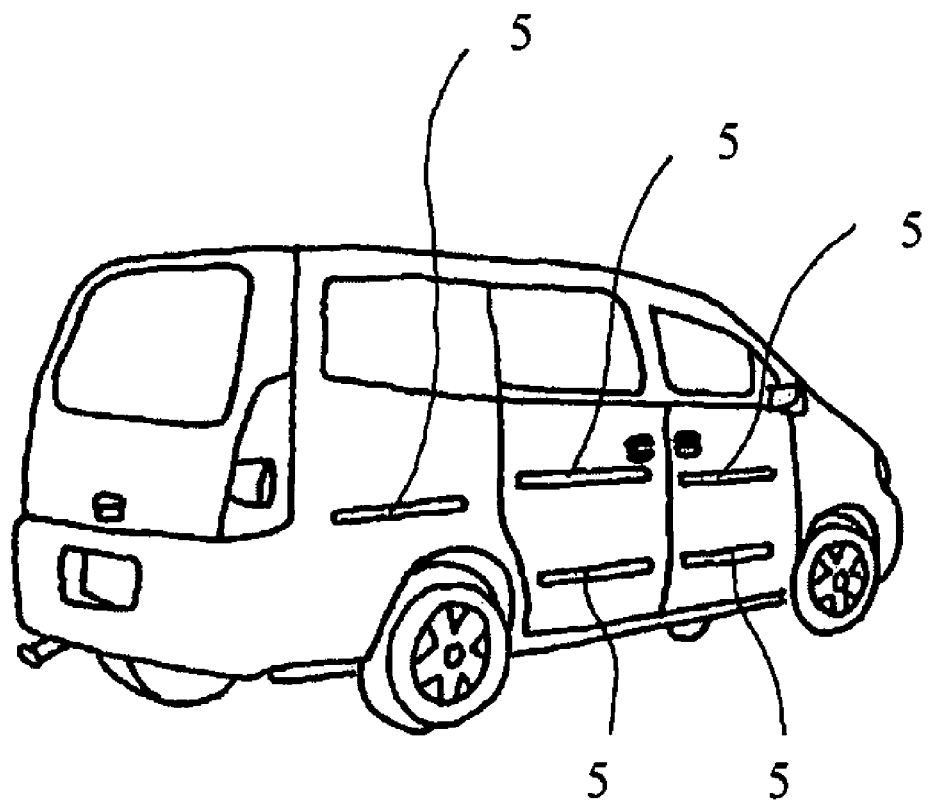
FIG. 18 is a perspective view showing a automobile installed with the second embodiment of the invention.
Figure 19:
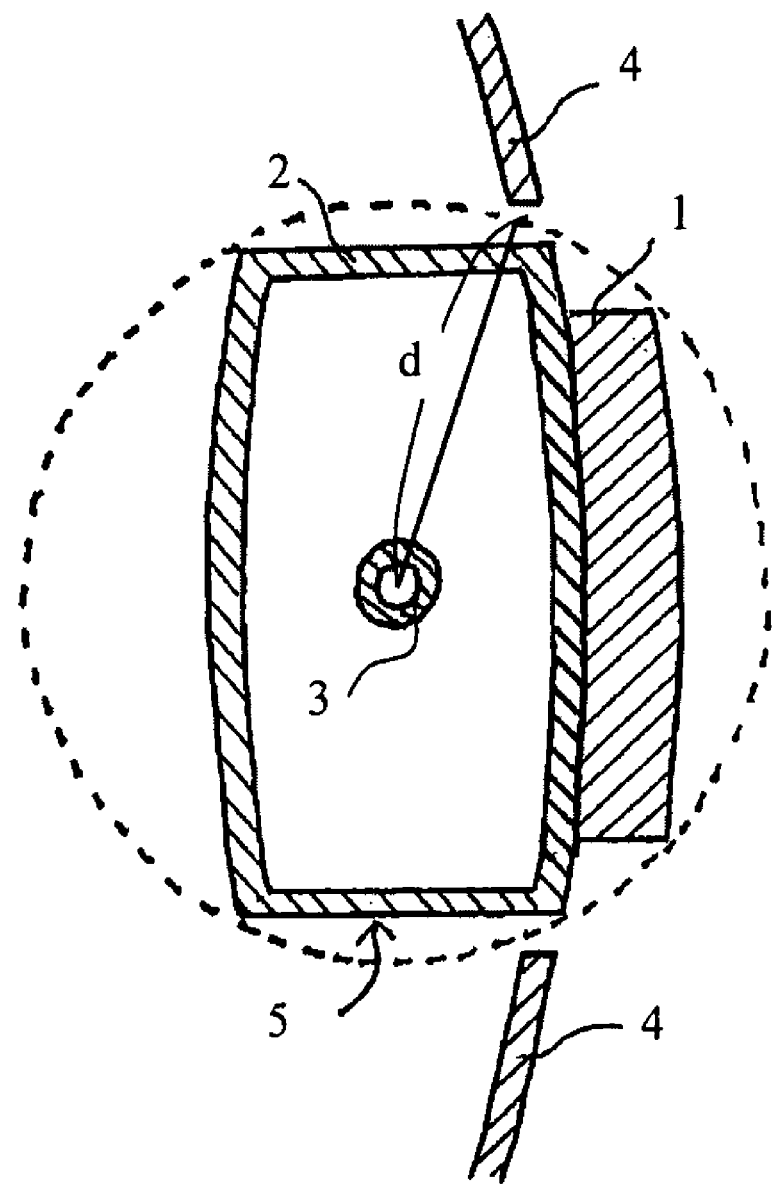
FIG. 19 is an explanatory sectional view showing a track of the perimeter of the rotatable body 5 when it is rotating.

The second embodiment of the invention will now be described. FIG. 18 is a perspective view showing a automobile installed with the second embodiment of the invention; FIG. 19 is an explanatory sectional view showing a track of perimeter of the rotatable body 5 when it is rotating. In FIG. 19, the broken line indicates a circle such that the distance d between the rotary shaft 3 and the edge of the opening of the automobile body 4 is taken as the radius of the circle and the rotary shaft 3 is taken as the center of the circle.

To protect the automobile body 4 more effectively, it is desired to project the article for protecting an automobile body (hereinafter called as "protection member") 1 farther such that the protection range of the automobile body 4 is increased. However, if the protection member 1 is projected to the extent that the end of the protection member 1 exceeds the broken line in FIG. 19, when the rotatable body 5 rotates, the end of the protection member 1 interferes with the end of the opening of the automobile body 4 and prevents further rotation of the rotatable body 5.

Figure 21:
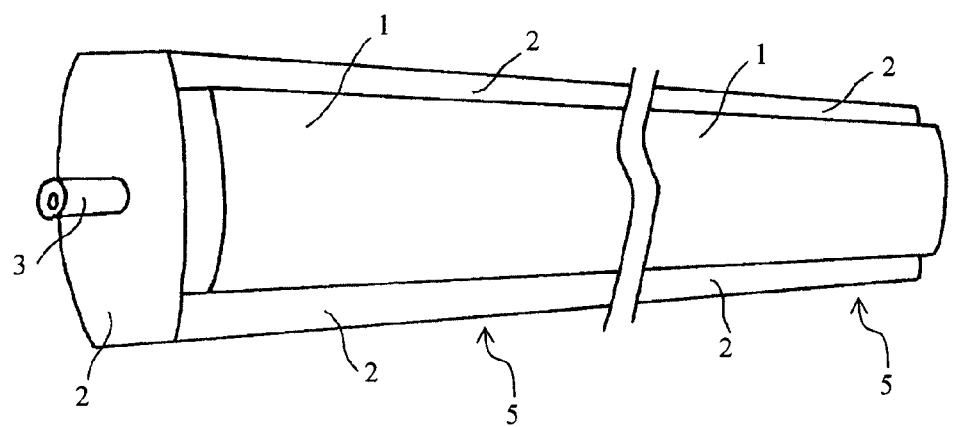
FIG. 21 and FIG. 22 are explanatory perspective views showing the second embodiment of the invention.
Figure 22:
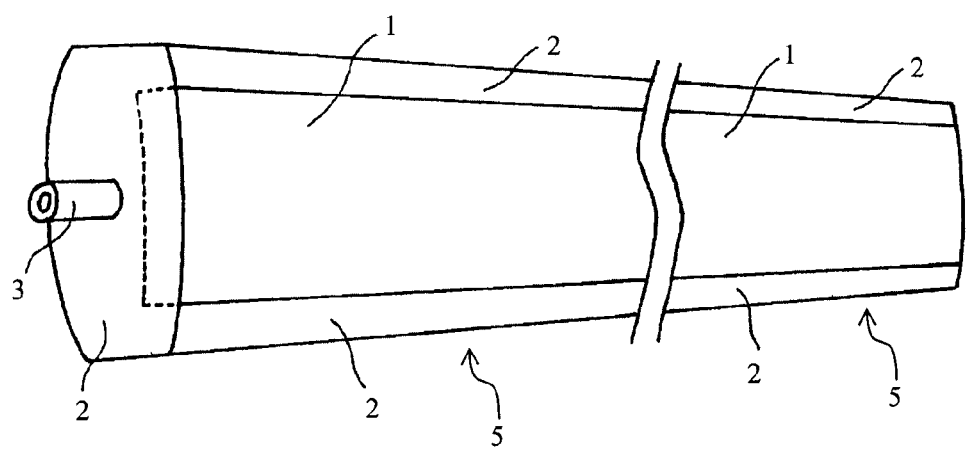

The second embodiment of the invention can solve the above problem. FIGS. 20A-20E are explanatory sectional views showing the second embodiment of the invention; FIG. 21 and FIG. 22 are explanatory perspective views showing the second embodiment of the invention.

Figure 20A:
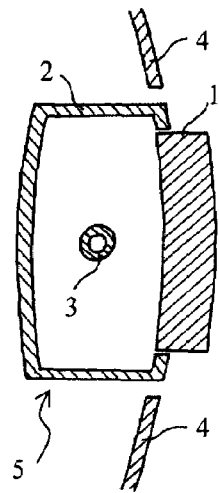
FIGS. 20A-20E are explanatory sectional views showing the second embodiment of the invention.
Figure 20B:
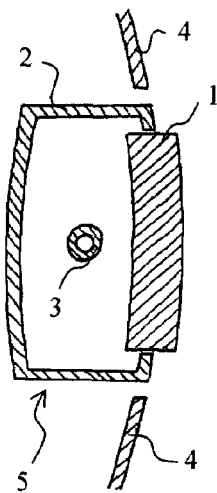
Figure 20C:
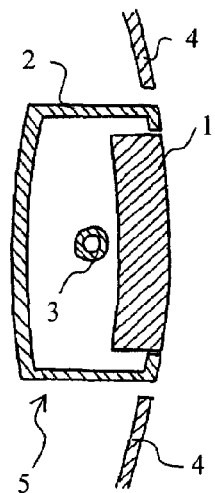

FIG. 20A shows the protection member 1 projecting from the automobile body 4. As shown in FIGS. 20B and 20C sequentially, the protection member 1 moves horizontally to be stored inside an article having the same material as the automobile body (hereinafter called as "base member") 2. In other words, the protection member 1 is retracted from the state shown in FIG. 21, in which the protection member 1 is projecting from the automobile body 4, to be stored inside the base member 2, as shown in FIG. 22.

Figure 20D:
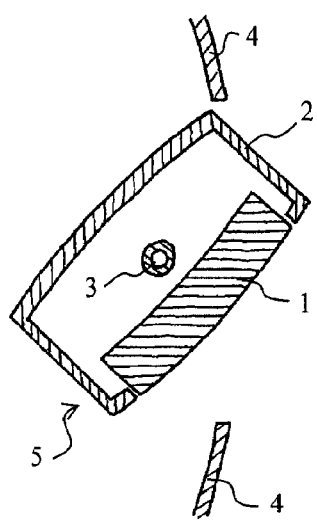
Figure 20E:
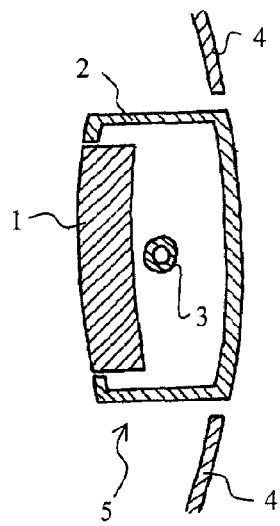

Then, as shown in FIGS. 20D and 20E sequentially, the rotatable body 5 rotates approximately 180 degrees clockwise or counterclockwise, such that the protection member 1 is concealed within the automobile body 4. As shown in FIGS. 20D and 20E, the protection member 1 is stored in the base member 2 when the rotatable body 5 is rotating.

According to this configuration, the interference between the protection member 1 and the automobile body 4 can be prevented during the rotation of the rotatable body 5, and the protection member 1 can be projected beyond the broken line in FIG. 19 when the protection member 1 is projected.

In addition, the center of gravity of the rotatable body 5 is shifted closer to the rotary shaft 3 by storing the protection member 1 into the base member 2, such that the rotatable body 5 is balanced in weight to smooth the rotation of the rotatable body 5.

When the protection member 1 is being projected from the automobile body 4, the process is carried out in the opposite sequence described above. The rotatable body 5 rotates approximately 180 degrees from the concealed state shown in FIG. 20E, such that the protection member 1 faces the outside of the automobile body 4 as shown in FIG. 20C. Then, the protection member 1 is advanced toward the outside of the automobile body 4 as shown in FIGS. 20B and 20A sequentially.

The device for moving the protection member 1 horizontally is composed of a rack and pinion, a step motor, a controller for driving the step motor and a sensor. By controlling the rotation direction and the rotation amount of the step motor using the controller, the moving direction and the moving amount of the protection member 1 may be controlled. Similarly, the position of the protection member 1 may be held at a certain point by the controller.

According to this configuration, the protection member 1 may be advanced toward the outside of the automobile body 4 and retracted in the opposite direction. By setting the moving amount of the protection member 1 in the controller in advance, the projecting position of the protection member 1 may be fixed when the protection member 1 is projected.

Also, the protection member 1 may be projected by the optional amount. For, example, by sending a control signal from a remote controller to the controller for driving the step motor, the position of the protection member 1 can be controlled. According to this configuration, the amount of projection of the protection member 1 may be adjusted to be relatively small when the automobile is parked in narrow space.

Furthermore, by detecting the rotation position of the rotatable body 5 using the sensor, the movement of the protection member 1 may be allowed only if the protection member 1 faces the outside of the automobile body 4 and is disposed horizontally.

Moreover, by providing a sensor to detect the position of the protection member 1, the rotation of the rotatable body 5 is stopped if the sensor detects that the position of the protection member 1 is beyond the broken line in FIG. 19, such that the interference between the protection member 1 and the end of the opening of the automobile body 4 may be prevented.

Figure 23A:
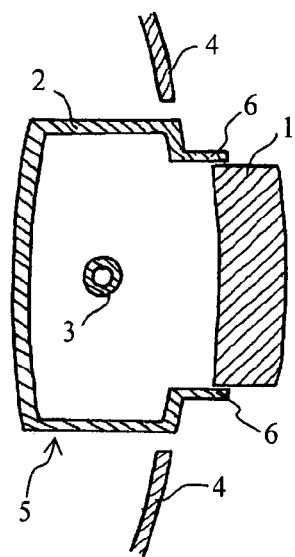
FIGS. 23A-23F are explanatory sectional views showing the third embodiment of the invention.
Figure 23B:
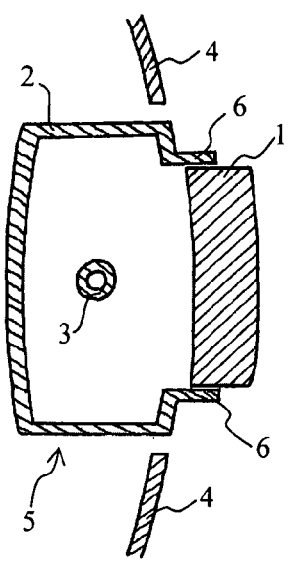
Figure 23C:
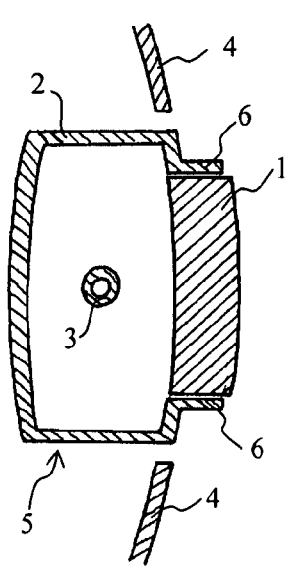

The third embodiment of the invention will now be described. FIGS. 23A-23F are explanatory sectional views showing the third embodiment of the invention; FIG. 24 is an explanatory front view showing the third embodiment of the invention.

The third embodiment is different from the above described second embodiment in that the base member 2 includes a frame member 6 surrounding the perimeter of the protection member 1. As shown in FIGS. 23A and 24, the frame member 6 is provided at the end of the opening positioned in a side surface of the base member 2. The frame member 6 projects from the end of the opening of the base member 2. The base member 2 and the frame member 6 may be formed from individual parts respectively, then connected to each other. Also, the base member 2 and the frame member 6 may be formed integrally.

As shown in FIG. 24, the frame member 6 is configured to support the upper, lower, right and left side surfaces of the protection member 1 as viewed from the moving direction of the protection member 1. In the third embodiment of the invention, the protection member 1 is advanced from and retracted into the frame member 6 while the sides of the protection member 1 are being supported by the frame member 6.

Figure 23D:
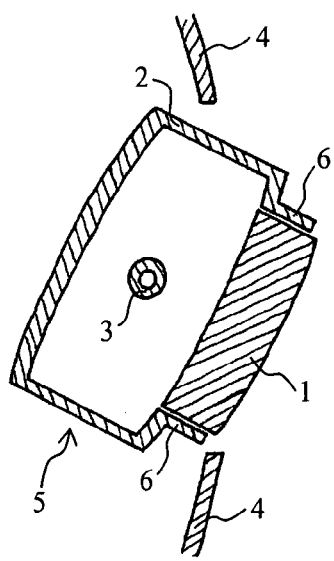
Figure 23E:
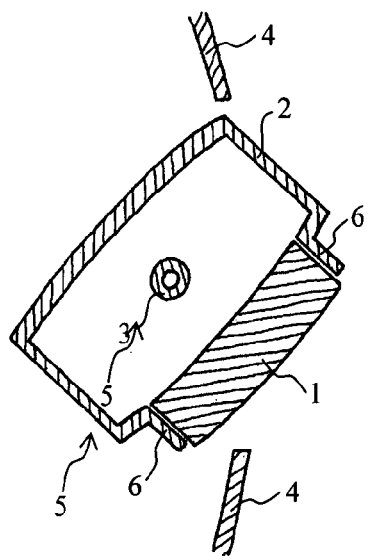
Figure 23F:
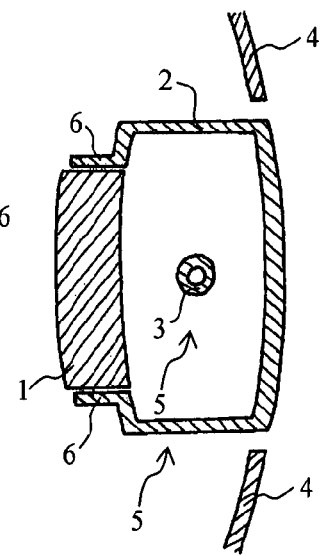
Figure 24:
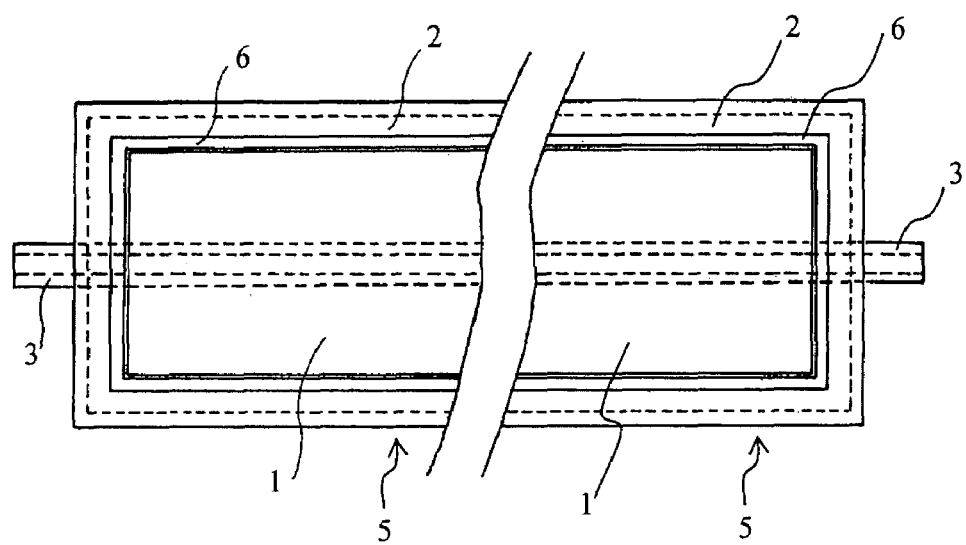
FIG. 24 is an explanatory front view showing the third embodiment of the invention.

As shown in FIGS. 23D-23F sequentially, the rotatable body 5 rotates approximately 180 degrees clockwise or counterclockwise, the protection member 1 is concealed within the automobile body 4. As shown in FIGS. 23D-23F, the protection member 1 is stored in the frame member 6 when the rotatable body 5 is rotating.

In the above second embodiment, considering the support mechanism supporting the protection member 1, when the protection member 1 is projected, it is desired not to project the protection member 1 farther to the extent that the protection member 1 and the base member 2 are apart and a gap is formed between the protection member 1 and the base member 2.

In addition, there is a structural maximum to the depth of the protection member 1 since, considering the rotation of the rotatable body 5, the protection member 1 is required not to exceed the broken line in FIG. 19 when it is stored in the base member 2. Therefore, in the second embodiment, there is a structural maximum to the projecting amount of the protection member 1 when the protection member 1 is projected and thus, it is difficult for the protection member 1 to project farther beyond the broken line in FIG. 19.

In the third embodiment of the invention, since the frame member 6 projects from the base member 2 and the protection member 1 farther projects from the projected frame member 6, the protection member 1 can be projected farther than the second embodiment. Therefore, the protection range of the automobile body 4 can be increased by projecting the protection member 1 farther beyond the broken line in FIG. 19.

In addition, the rotation of the rotatable body 5 can be secured by configuring the frame member 6, which stores the protection member 1, such that the end of the frame member 6 does not exceed the broken line in FIG. 19. Moreover, a foreign object is prevented from entering into the inside of the device since the opening of the base member 2 is covered by the frame member 6.

Figure 25A:
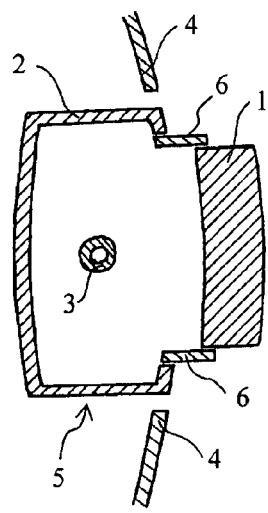
FIGS. 25A-25E are explanatory sectional views showing the fourth embodiment of the invention.
Figure 25B:
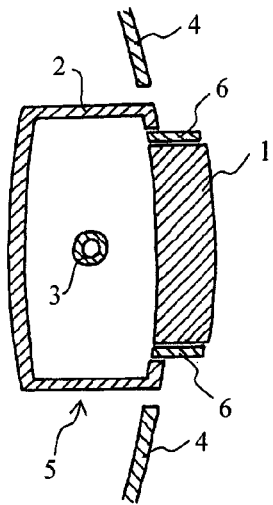
Figure 25C:
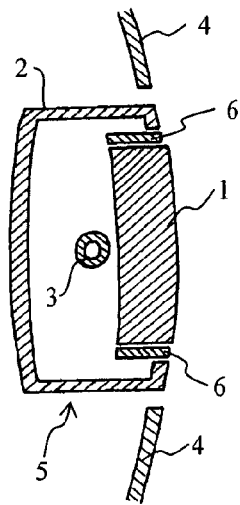

The fourth embodiment of the invention will now be described. FIGS. 25A-25E are explanatory sectional views showing the fourth embodiment of the invention; FIG. 26 is an explanatory front view showing the fourth embodiment of the invention.

The fourth embodiment is different from the above described third embodiment in that the frame member 6 is configured to be movable. As shown in FIGS. 25A-25C, the frame member 6 moves horizontally similar to the protection member 1 and is stored in the base member 2.

The base member 2 and the frame member 6 are formed from individual parts respectively. The frame member 6 is horizontally advanced from and retracted into the base member 2. The protection member 1 is horizontally advanced from and retracted into the frame member 6.

When the frame member 6 is projected, it is desired not to project the frame member 6 farther to the extent that the frame member 6 and the base member 2 are apart and a gap is formed between the frame member 6 and the base member 2. Also, when the protection member 1 is projected, it is desired not to project the protection member 1 farther to the extent that the protection member 1 and the frame member 6 are apart and a gap is formed between the protection member 1 and the frame member 6.

Figure 25D:
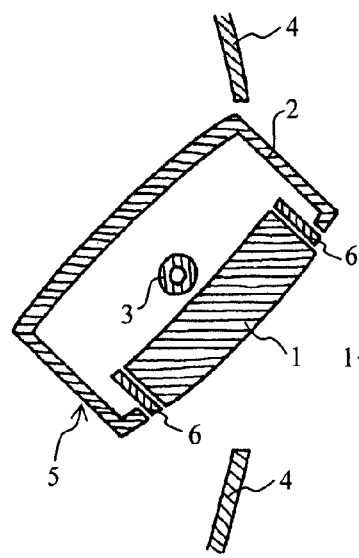
Figure 25E:
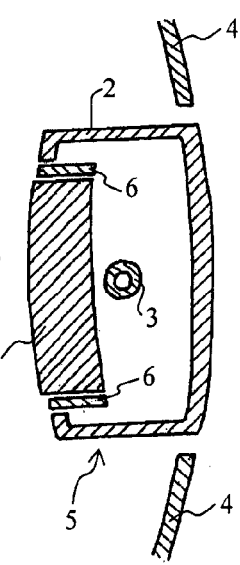
Figure 26:
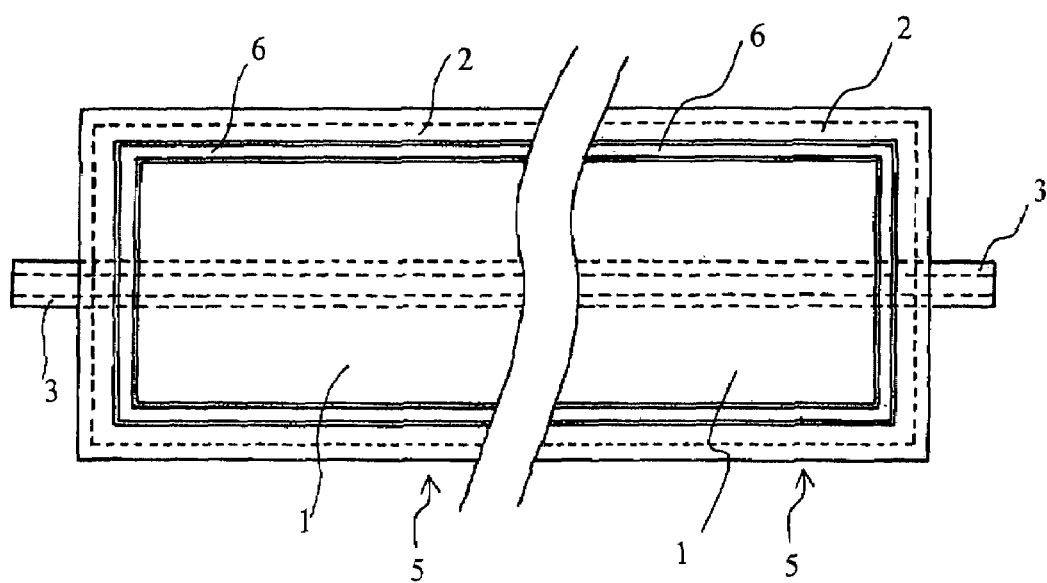
FIG. 26 is an explanatory front view showing the fourth embodiment of the invention.

As shown in FIGS. 25D and 25E sequentially, the rotatable body 5 rotates approximately 180 degrees clockwise or counterclockwise, the protection member 1 is concealed within the automobile body 4. As shown in FIGS. 25D and 25E, the protection member 1 and the frame member 6 are stored in the base member 2 when the rotatable body 5 is rotating.

According to this configuration, when the protection member 1 is projected, the protection member 1 can be projected farther beyond the broken line in FIG. 19 by supporting the protection member 1 using the frame member 6. In addition, the center of gravity of the rotatable body 5 is shifted closer to the rotary shaft 3, such that the rotatable body 5 is balanced in weight to smooth the rotation of the rotatable body 5.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

I claim:

1. A device for storing an article for protecting an automobile body, said device comprising:
   a rotatable body comprising a first article and a second article,
   said first article being disposed at least partially within said rotatable body, and configured to protect an exterior portion of the automobile body; and
   said second article surrounding an axis of rotation positioned within the automobile body,
   wherein said rotatable body rotates about said axis of rotation,
   wherein said rotatable body has a first position and a second position such that, in said first position, said first article extends from the automobile body to protect the automobile body, and, in said second position, said first article is concealed within the automobile body,
   wherein the rotatable body rotates approximately 180 degrees to change its position from said first position to said second position, and
   wherein said first article is configured to be horizontally moved and stored.

2. The device of claim 1, wherein said first article is further configured to be horizontally moved and stored into said second article.

3. The device of claim 1, wherein said rotable body further comprises a frame projecting from said second article and at least partially surrounding a side surface of said first article.

4. The device of claim 3, wherein said first article is further configured to be horizontally moved and stored into said frame.

5. The device of claim 4, wherein said frame is configured to be horizontally moved and stored into said second article.

6. A device for storing an article for protecting an automobile body, said device comprising:
   a rotatable body comprising a first article and a second article,
   said first article being disposed at least partially within said rotatable body, and configured to protect an exterior portion of the automobile body; and
   said second article surrounding an axis of rotation positioned within the automobile body,
   wherein said rotatable body rotates about said axis of rotation,
   wherein said rotatable body has a first position and a second position such that, in said first position, said first article extends from the automobile body to protect the automobile body, and, in said second position, said first article is concealed within the automobile body,
   wherein, with respect to a cross-section taken perpendicular to said axis of rotation, said axis of rotation extends along the center of said second article, and
   wherein said first article is configured to be horizontally moved and stored.

7. The device of claim 6, wherein said first article is further configured to be horizontally moved and stored into said second article.

8. The device of claim 6, wherein said rotable body further comprises a frame projecting from said second article and at least partially surrounding a side surface of said first article.

9. The device of claim 8, wherein said first article is further configured to be horizontally moved and stored into said frame.

10. The device of claim 9, wherein said frame is configured to be horizontally moved and stored into said second article.

* * * * *